(12) United States Patent
Ko et al.

(10) Patent No.: US 10,120,269 B2
(45) Date of Patent: Nov. 6, 2018

(54) PROJECTION APPARATUS WITH DEVICE FOR ADJUSTING PROJECTION ANGLE OF PROJECTION IMAGE

(71) Applicant: Coretronic Corporation, Hsin-Chu (TW)

(72) Inventors: Tung-Yi Ko, Hsin-Chu (TW); I-Hsien Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/253,902

(22) Filed: Sep. 1, 2016

(65) Prior Publication Data
US 2017/0153534 A1    Jun. 1, 2017

(30) Foreign Application Priority Data
Nov. 30, 2015  (CN) .......................... 2015 1 0856772

(51) Int. Cl.
*G03B 21/14*    (2006.01)
*G03B 21/20*    (2006.01)

(52) U.S. Cl.
CPC ........... *G03B 21/145* (2013.01); *G03B 21/20* (2013.01); *G03B 21/2006* (2013.01);
(Continued)

(58) Field of Classification Search
CPC ........................... G03B 21/16; G03B 21/2093; G03B 21/2013; G03B 21/20; G03B 21/2033; G03B 21/208; G03B 21/2006; G03B 21/145; H04N 9/3144; F21V 29/402; F21V 29/40
See application file for complete search history.

(56) References Cited

U.S. PATENT DOCUMENTS 1,640,434 A  *  8/1927  Weston ................. H01R 33/94
                                                           439/644
5,989,070 A  *  11/1999  Al-Turki ............... F21V 19/006
                                                           439/638
(Continued)

FOREIGN PATENT DOCUMENTS

CN       104656363       5/2015
DE       102008012472    9/2009
(Continued)

OTHER PUBLICATIONS

"Office Action of China Counterpart Application," dated Apr. 3, 2018, p. 1-p. 6.

*Primary Examiner* — Bao-Luan Le
(74) *Attorney, Agent, or Firm* — JCIPRNET

(57) ABSTRACT

A projection apparatus includes a projection unit, a base and a pivoting member. The projection unit includes a light source, a light valve and a lens. The light source provides an illumination beam, the light valve converts the illumination beam into an image beam, and the lens projects the image beam. The base is connected to the projection unit and has at least one first stopping portion. The pivoting member is pivoted to the base and has at least one second stopping portion. The pivoting member is adapted to connect to an external power supply device, the base and the pivoting member are adapted to relatively rotate so as to adjust an angle of the projection image.

17 Claims, 8 Drawing Sheets

(52) U.S. Cl.
CPC ....... *G03B 21/208* (2013.01); *G03B 21/2013* (2013.01); *G03B 21/2033* (2013.01); *G03B 21/2093* (2013.01)

(56) References Cited

U.S. PATENT DOCUMENTS

| | | | | |
|---|---|---|---|---|
| 9,039,234 | B2 * | 5/2015 | Kasuga | F21V 23/04 362/257 |
| 9,081,269 | B2 | 7/2015 | Conti | |
| 9,298,072 | B2 * | 3/2016 | Kinebuchi | H04N 9/3185 |
| 9,316,889 | B2 * | 4/2016 | Baker | G03B 21/14 |
| 9,348,205 | B2 * | 5/2016 | Kasuga | F21V 23/04 |
| 9,389,496 | B2 * | 7/2016 | Nagatani | G03B 21/16 |
| 9,442,355 | B2 * | 9/2016 | Shinha | G03B 21/2013 |
| 9,478,929 | B2 * | 10/2016 | Smith | H01R 33/22 |
| 9,491,423 | B2 * | 11/2016 | Ko | H04N 9/3144 |
| 9,568,184 | B2 * | 2/2017 | Kasuga | G03B 21/145 |
| D780,823 | S * | 3/2017 | Ishikawa | D16/235 |
| D781,367 | S * | 3/2017 | Ishikawa | D16/235 |
| 9,618,825 | B2 * | 4/2017 | Shinha | G03B 7/26 |
| 2004/0223331 | A1 | 11/2004 | Kao | |
| 2009/0045715 | A1 * | 2/2009 | Shantha | H01J 5/54 313/51 |
| 2014/0043516 | A1 * | 2/2014 | Baker | G03B 21/14 348/333.1 |
| 2014/0043544 | A1 * | 2/2014 | Kasuga | F21V 33/0052 348/744 |
| 2014/0098303 | A1 * | 4/2014 | Kasuga | F21V 23/04 349/5 |
| 2014/0139811 | A1 * | 5/2014 | Shinha | G03B 21/2013 353/38 |
| 2014/0139812 | A1 * | 5/2014 | Nagatani | G03B 21/16 353/52 |
| 2014/0168618 | A1 * | 6/2014 | Kinebuchi | H04N 9/3185 353/70 |
| 2014/0347266 | A1 * | 11/2014 | Kasuga | G03B 21/145 345/156 |
| 2015/0029406 | A1 * | 1/2015 | Shinha | H04N 5/63 348/744 |
| 2015/0159825 | A1 * | 6/2015 | Flynn | F21S 9/02 362/183 |
| 2015/0227033 | A1 * | 8/2015 | Kasuga | F21V 23/04 349/5 |
| 2015/0369462 | A1 * | 12/2015 | Smith | H01R 33/22 362/95 |

FOREIGN PATENT DOCUMENTS

| | | |
|---|---|---|
| GB | 2447792 | 9/2008 |
| TW | M27622828 | 9/2005 |
| TW | M332788 | 5/2008 |

* cited by examiner

PROJECTION APPARATUS WITH DEVICE FOR ADJUSTING PROJECTION ANGLE OF PROJECTION IMAGE

CROSS-REFERENCE TO RELATED APPLICATION

This application claims the priority benefit of China application serial no. 201510856772.X, filed on Nov. 30, 2015. The entirety of the above-mentioned patent application is hereby incorporated by reference herein and made a part of this specification.

FIELD OF THE INVENTION

The invention relates to a display apparatus. More particularly, relates to a projection apparatus.

DESCRIPTION OF RELATED ART

A projection apparatus is used as a display apparatus for producing a large-size image. The imaging principle of a projection apparatus is based on converting an illumination beam generated by a light source module into an image beam through a light valve, and then, projecting the image beam onto a screen or wall through a projection lens so as to form images. With the advances in projection technology and lower manufacturing costs, the application of the projection apparatus has been gradually expanded to domestic purposes from commercial purpose.

In general, the projection apparatus needs a separate power cord to connect an external power supply device (such as an indoor power socket), so the projection apparatus is unable to be used without the power cord. In addition, the projection apparatus is generally placed on a table and occupies the use space of the table. The projection apparatus may also be suspended below the ceiling via a support bracket or set up on the floor, however this set up method may need an additional support frame for the projection apparatus, thereby causing that the set up of the projection apparatus will be inconvenient and the projection direction and location will also be restricted. Furthermore, in general, the user may enter the software mode of the projection apparatus to do fine trimming the angle of the projection image so as to achieve a good projection quality. However, in addition to this adjusting method, how to get the user to conveniently change the angle of the body of the projection apparatus and adjust the angle of the projection image, i.e., the body design of the projection apparatus is also an important issue.

The information disclosed in this "Description of Related Art" section is only for enhancement understanding of the background of the invention and therefore it may contain information that does not form the prior art that is already known to a person of ordinary skill in the art. Furthermore, the information disclosed in this "Description of Related Art" section does not mean that one or more problems to be solved by one or more embodiments of the invention were acknowledged by a person of ordinary skill in the art.

SUMMARY OF THE DISCLOSURE

The invention provides a projection apparatus adapted to be used in a common lamp holder having a bulb connector, set up of the projection apparatus is simple, and the user may conveniently change the angle of the base of the projection apparatus and adjust the projection position of the projection image.

Other objects and advantages of the invention can be further illustrated by the technical features broadly embodied and described as follows.

To achieve one, a part, or all of the objectives aforementioned or other objectives, one embodiment of the invention provides a projection apparatus including a projection unit, a base and a pivoting member. The projection unit includes a light source, a light valve and a lens, wherein the light source is adapted to provide an illumination beam, the light valve is adapted to convert the illumination beam into an image beam, and the lens is adapted to project the image beam so as to form a projection image. The base is connected to the projection unit and has at least one first stopping portion. The pivoting member is pivoted to the base and has at least one second stopping portion, wherein the pivoting member is adapted to connect to an external power supply device, the base and the pivoting member are adapted to relatively rotate so as to adjust an angle of the projection image, and the at least one first stopping portion and the at least one second stopping portion are adapted to stop each other, so as to restrict a range of a relative rotation of the base and the pivoting member.

In light of the above, according to the embodiments the invention, at least one of the following advantages or effects is achieved. The projection apparatus provided in the invention may be connected to an external power supply device through the pivoting member, so as to obtain a required electric power from the external power supply device. The so-called external power supply power device is, for example, a lamp holder existing in a general indoor environment, the projection apparatus can be installed to the lamp holder without using a power cord, as installing a lamp, thus the installation is simple. Moreover, the base of the projection apparatus may be rotated relative to the pivoting member merely by applied force of the user in order to change the angle of the base and the projection unit disposed thereon, thus the user is able to conveniently perform the angle adjustment of the projection images. Additionally, through the first stopping portion of the base and the second stopping portion of the pivoting member stopping each other, the rotation range of the base rotated by the user may be restricted, such that the user may perform the angle adjustment of the projection images in a predetermined angle range.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can he positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
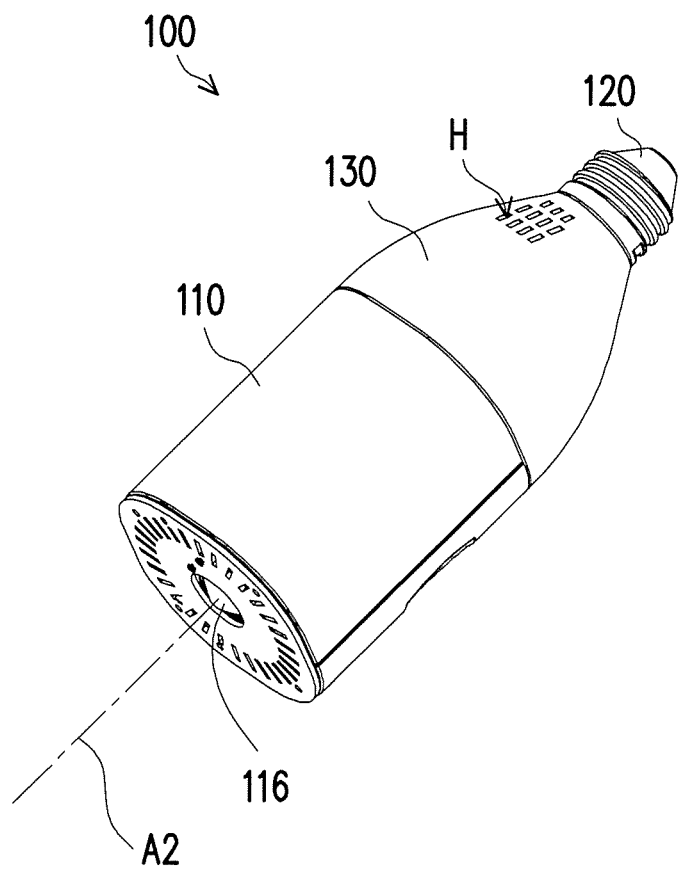
FIG. 1 is a schematic perspective view of a projection apparatus according to one embodiment of the invention.
Figure 2:
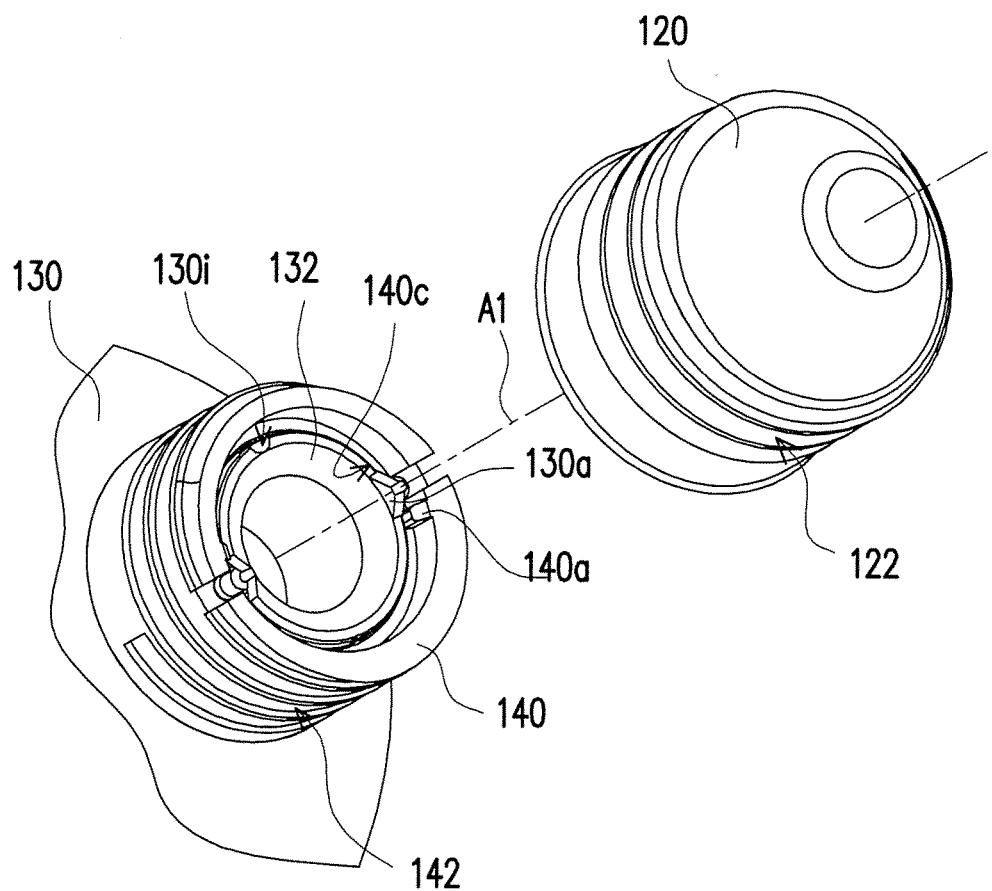
FIG. 2 is a partial structure exploded view of the projection apparatus in FIG. 1.

FIG. 1 is a schematic perspective view of a projection apparatus according to one embodiment of the invention. FIG. 2 is a partial structure exploded view of the projection apparatus in FIG. 1. Referring to FIG. 1 and FIG. 2, the projection apparatus 100 of the embodiment includes a projection unit 110, an electrical connecting member 120, a base 130 and a pivoting member 140. The projection unit 110 is connected to the base 130. The pivoting member 140 is pivoted to the base 130 and covered by the electrical connecting member 120, through connecting the electrical connecting member 120 to an external power supply device (not shown in the drawings), the projection unit 110 may obtain the required electric power from the external power supply device. The so-called external power supply power device is, for example, a lamp holder existing in a general indoor environment, such as lamp holder E26, lamp holder E27, etc., but the invention is not limited thereto, and the projection apparatus 100 can be installed to the lamp holder without using a power cord, as installing a lamp, thus the installation is simple.

Figure 3:
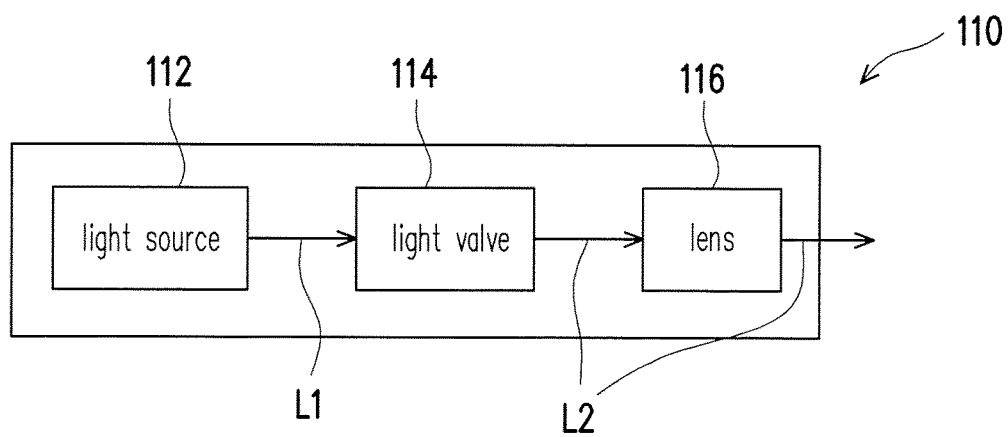
FIG. 3 is a schematic view of the projection unit in FIG. 1.

FIG. 3 is a schematic view of the projection unit n FIG. 1. The projection unit 110 includes a light source 112, a light valve 114 and a lens 116, wherein the light source 112 is adapted to provide an illumination beam L1, the light valve 114 is adapted to convert the illumination beam L1 into an image beam L2, and the lens 116 is adapted to project the image beam L2 out of the projection unit 110 so as to form a projection image, for the user to watch.

Figure 4:
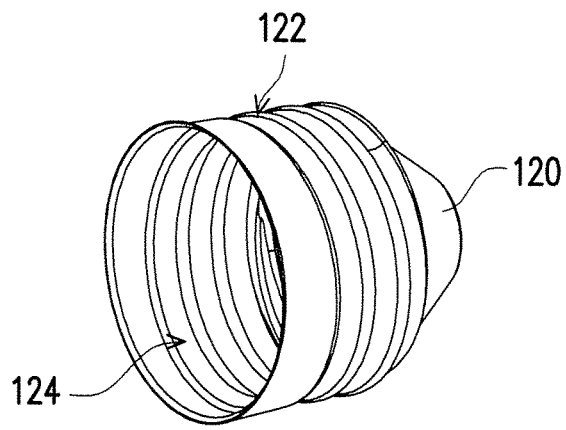
FIG. 4 is a schematic perspective view illustrating the electrical connecting member depicted in FIG. 2 from another view angle.

FIG. 4 is a schematic perspective view illustrating the electrical connecting member depicted in FIG. 2 from another view angle. Referring to FIG. 2 and FIG. 4, in the embodiment, the pivoting member 140 has a first outer thread 142, and the electrical connecting member 120 has a second outer thread 122 and an inner thread 124. The pivoting member 140 and the electrical connecting member 120 may be screwed to each other through the first outer thread 142 and the inner thread 124, and the electrical connecting member 120 may be screwed to the external power supply device through the second outer thread 122. Further, the electrical connecting member 120 has, for example, a wire (not shown), the wire passes through the pivoting member 140 and the base 130 and is connected to the projection unit 110 shown in FIG. 1, so that the projection unit 110 receives the electric power from the external power supply device through the wire and the electrical connecting member 120. The electrical connection of the electrical connecting member 120 and the external power supply device is, for example, the same as or similar to the electrical connection of a general light bulb connector and the lamp holder, and the description is omitted herein.

The connection of the pivoting member 140 and the external power supply device is not limited by the invention. In other embodiments, the disposing of electrical connecting member 120 may be omitted, and the pivoting member 140 may be screwed to the external power supply device through the first outer thread 142. In such configuration, assuming that the pivoting member 140 has, for example, a wire, the wire passes through the base 130 and is connected to the projection unit 110 shown in FIG. 1, so that the projection unit 110 receives the electric power from the external power supply device through the wire and the pivoting member 140. The electrical connection of the pivoting member 140 and the external power supply device is, for example, the same as or similar to the electrical connection of a general light bulb connector and the lamp holder, and the description is omitted herein.

In the embodiment, since the pivoting member 140 is pivoted to the base 130 as abovementioned, the base 130 may be rotated relative to the pivoting member 140 merely by applied force of the user in order to change the angle of the base 130 and the projection unit 110 disposed thereon, so that the user is able to conveniently perform the angle adjustment of the projection images. In addition, the user may rotate the base 130 to change the location and direction of the heat dissipating holes H (shown in FIG. 1) of the base 130, so that a good heat dissipation efficiency may be achieved via the heat dissipating holes H.

In detailed, the pivoting member 140 is, for example, pivoted to the base 130 along the rotation axis A1 as shown in FIG. 2, such that the base 130 and the pivoting member 140 may relatively rotate along the rotation axis A1 by the applied force of the user, and the rotation axis A1 is, for example, parallel to the optical axis A2 (indicated in FIG. 1) of the lens 116. As mentioned above, after the user installed the projection apparatus 100 to the external power supply device through the rotation method of screwing the second outer thread 122 of the electrical connecting member 120, if the projection unit 110 and the projection image thereof are in a skewed status due to the screw rotation process, then the user may rotate the base 130 along the rotation axis A1 to drive the projection unit 110 to rotate along the optical axis A2, at this time the projection image perpendicular to the optical axis A2 may also be rotated along with the rotation of the optical axis A2, thereby the projection image may be adjusted to be in the location and direction that the user desires to watch, so that the skewed status of the projection unit 110 and the projection image may be improved.

Figure 5:
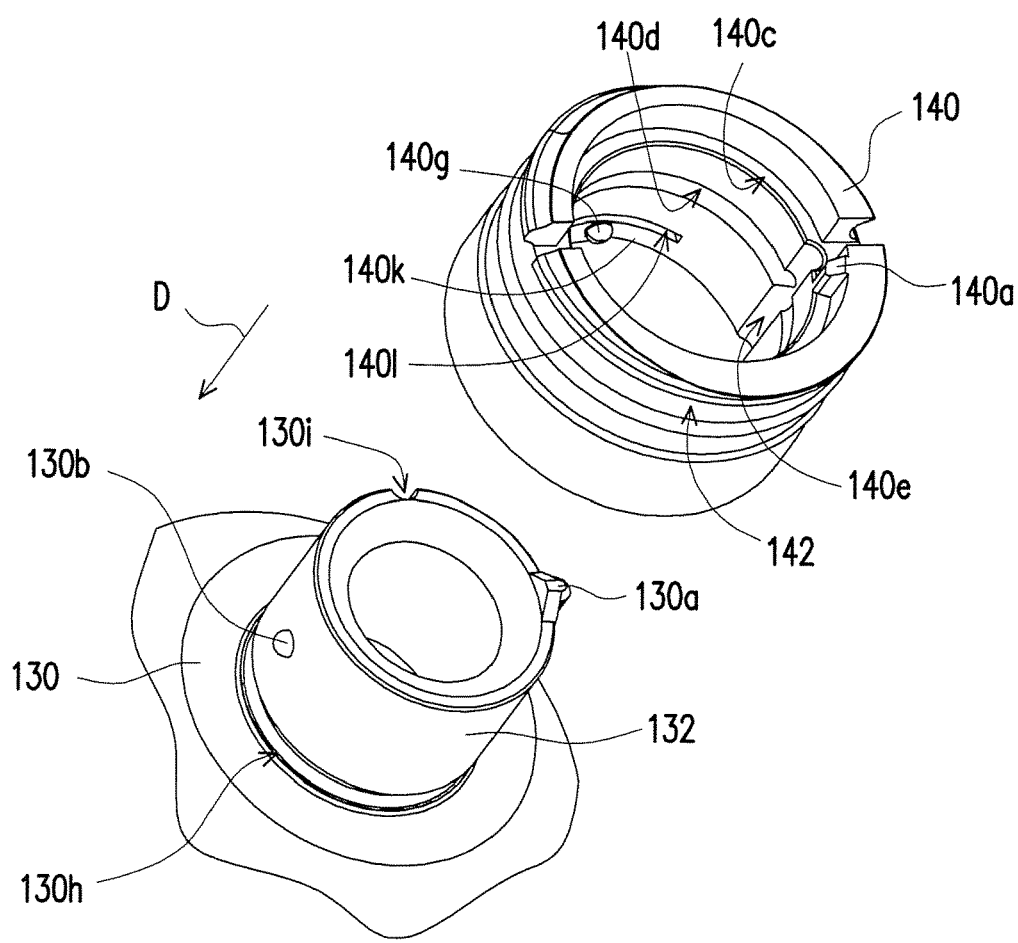
FIG. 5 is an exploded view showing the base and the pivoting member in FIG. 2.
Figure 6:
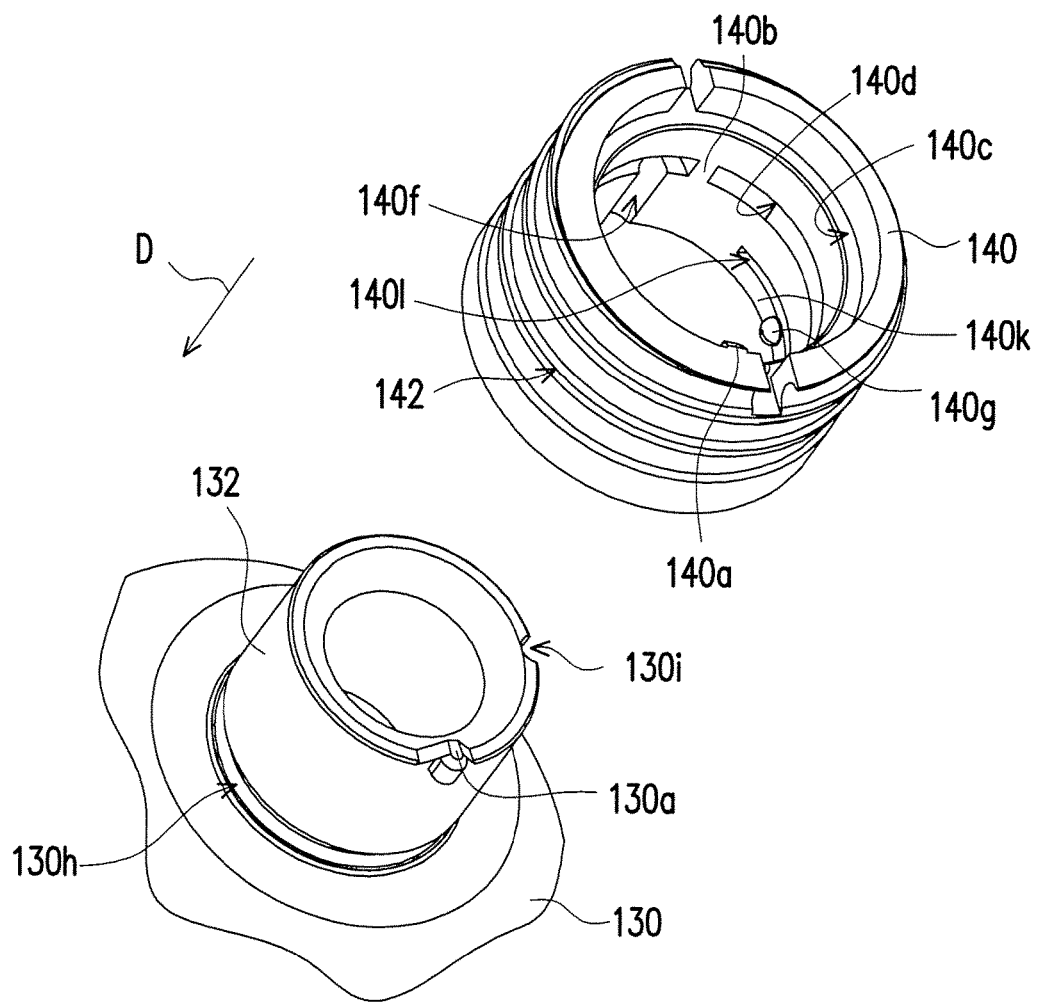
FIG. 6 is an exploded view illustrating the base and the pivoting member depicted in FIG. 5 from another view angle.

FIG. 5 is an exploded view showing the base and the pivoting member in FIG. 2. FIG. 6 is an exploded view illustrating the base and the pivoting member depicted in FIG. 5 from another view angle. Referring to FIG. 2, FIG. 5 and FIG. 6 together, the base 130 of the embodiment has at least one first stopping portion (two are shown in the drawings, the first stopping portions 130a and 130b). The pivoting member 140 has, correspondingly, at least one second stopping portion (two are shown in the drawings, the second stopping portions 140a and 140b). The first stopping portion 130a and the second stopping portion 140a are adapted to stop each other, and the first stopping portion 130b and the second stopping portion 140b are adapted to stop each other, in order to restrict the range of the relative rotation of the base 130 and the pivoting member 140, so that the user may perform the projection image adjustment in a predetermined angle range. The specific configuration and action of the first stopping portions 130a, 130b and the second stopping portions 140a, 140b are described in detailed as follows.

The pivoting member 140 is, for example, annular and disposed around a protrusion portion 132 of the base 130, the first stopping portions 130a, 130b are formed at the outer wall of the protrusion portion 132 of the base, and the second stopping portions 140a, 140b are Ruined at the inner wall of the pivoting member 140. The pivoting member 140 has at least one guiding slot (two are shown in the drawings, the guiding slots 140c and 140d), the second stopping portions 140a, 140b are formed in the guiding slot 140c and the guiding slot 140d, respectively, and the first stopping portions 130a, 130b are adapted to respectively move along the guiding slot 140c and the guiding slot 140d along with the relative rotation of the base 130 and the pivoting member 140.

Figure 7A:
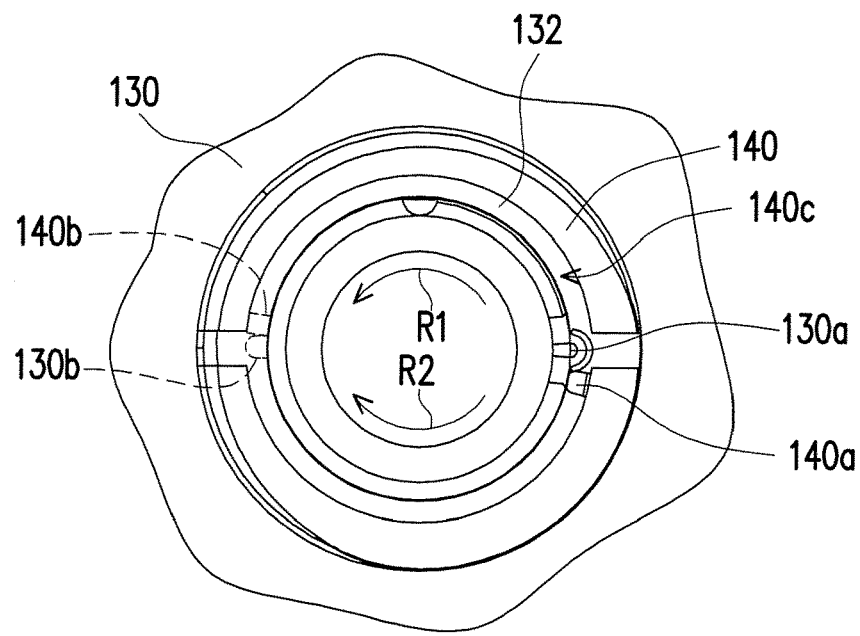
FIG. 7A and FIG. 7B illustrates the relative rotation of the base and the pivoting member in FIG. 2.
Figure 7B:
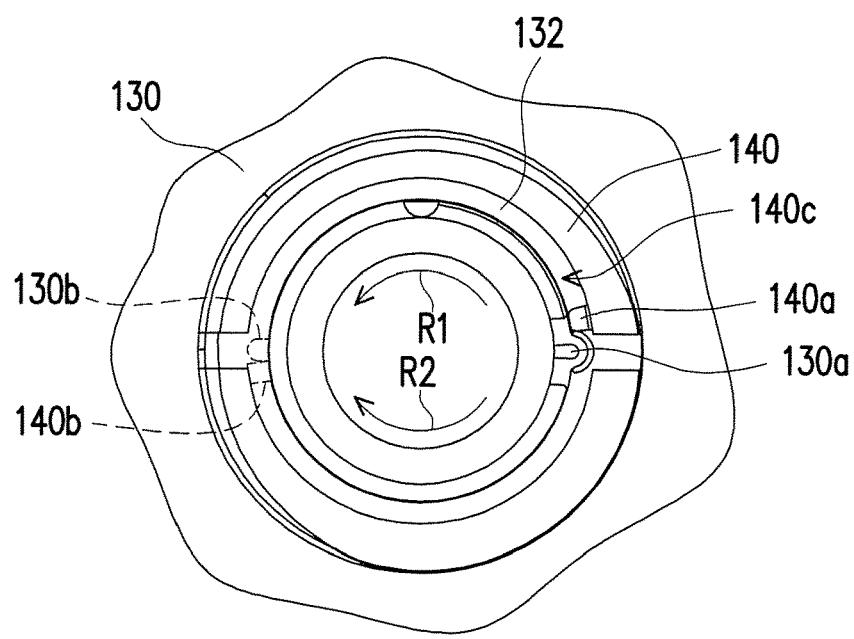

FIG. 7A and FIG. 7B illustrates the relative rotation of the base and the pivoting member in FIG. 2. Specifically, the base 130 may be rotated relative to the pivoting member 140 to the status shown in FIG. 7A by the applied force of the user, at this time the second stopping portion 140a props against to a side of the first stopping portion 130a and the second stopping portion 140b props against to a side of the first stopping portion 130b, so as to stop continuing to rotate the base 130 along the rotation direction R2 by the user. In addition, the base 130 may be rotated relative to the pivoting member 140 to the status shown in FIG. 7B by the applied force of the user, at this time the second stopping portion 140a props against to another side of the first stopping portion 130a and the second stopping portion 140b props against to another side of the first stopping portion 130b, so as to stop continuing to rotate the base 130 along the rotation direction R1 by the user. As such configuration, the base 130 may rotate relative to the pivoting member 140 to be in the status shown in FIG. 7A and the status shown in FIG. 7B, and with a rotation angle range of 0 to 350 degrees, for example.

In the embodiment, by the numbers of the first stopping portions and the second stopping portions are respectively designed as two rather than a single, the overall structural strength of the base 130 and the pivoting member 140 when combined may be increased, so as to prevent the base 130 or the pivoting member 140 from damaged during the acting process due to the structural strength insufficient. In other embodiments, the first stopping portions and the second stopping portions may be other suitable numbers, but the invention is not limited thereto.

Referring to FIG. 5 and FIG. 6, the pivoting member 140 has at least one recessed slot (two are shown in the drawings, the recessed slots 140e and 140f), and the extending direction of the recessed slots 140e, 140f is parallel to the assembling direction D. When the base 130 and the pivoting member 140 are combined in the assembling direction D, the first stopping portions 130a, 130b respectively move along the recessed slots 140e, 140f and enter the guiding slots 140c, 140d. As such, the combination of the base 130 and the pivoting member 140 may not be hampered by the existing of the first stopping portions 130a, 130b.

Figure 8:
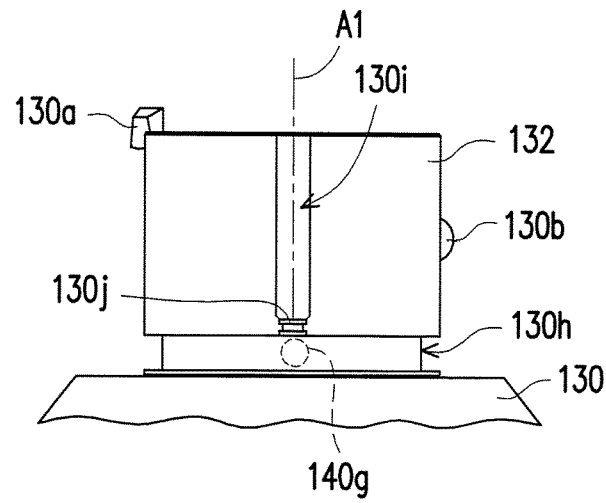
FIG. 8 is a side view showing the base in FIG. 5.

FIG. 8 is a side view showing the base in FIG. 5. To make the drawings clearer, the protruding portion 140g of the pivoting member 140 in FIG. 5 is shown in dotted line and other portions of the pivoting member 140 are not shown in FIG. 8. Referring to FIG. 5, FIG. 6 and FIG. 8, the pivoting member 140 of the embodiment has a protruding portion 140g, the base 130 has a position limiting slot 130h, when the base 130 and the pivoting member 140 are combined to each other, the protruding portion 140g is restricted in the position limiting slot 130h, so as to prevent the base 130 from separating from the pivoting member 140. In addition, the base 130 has a recessed slot 130i, the extending direction of the recessed slot 130i is parallel to the assembling direction D, when the base 130 and the pivoting member 140 are combined together in the assembling direction D, the protruding portion 140g moves along the recessed slot 130i and enters the position limiting slot 130h. As such, the combination of the base 130 and the pivoting member 140 may not be hampered by the existing of the protruding portion 140g.

In the embodiment, the base 130 has a stopping block 130j at the common boundary between the recessed slot 130i and the position limiting slot 130h, and the stopping block 130j is adapted to stop the protruding portion 140g which is in the position limiting slot 130h from moving into the recessed slot 130i, so as to prevent the base 130 and the pivoting member 140 from separated from each other in undesired situations. In addition, the pivoting member 140 of the embodiment has an elastic arm 140k as shown in FIG. 5 and FIG. 6, and the protruding portion 140g is formed on the elastic arm 140k. As such, in the combination process of the base 130 and the pivoting member 140, the protruding portion 140g may go beyond the stopping block 130j and reach into the position limiting slot 130h due to the elastic deformation of the elastic arm 140k. In the embodiment, for example, the elastic arm 140k may be formed correspondingly via forming an open slot 140l on the inner wall of the pivoting member 140. In other embodiments, other types of elastic structures may replace the elastic arm 140k, and the invention is not limited thereto.

Referring to FIG. 8, in the embodiment, the projections projected onto the rotation axis A1 of the first stopping portion 130a and the first stopping portion 130b are not overlapped. Thereby, the projections projected onto the rotation axis A1 of the second stopping portion 140a and the second stopping portion 140b (shown in FIG. 6), respectively corresponding to the first stopping portion 130a and the first stopping portion 130b, are also not overlapped. Namely, the height where the first stopping portion 130a and the second stopping portion 140a exist and the height where the first stopping portion 130b and the second stopping portion 140b exist are not the same, so that the first stopping portion 130a and the second stopping portion 140b stopping each other during the relative rotation process of the base 130 and the pivoting member 140 may be prevented, and the first stopping portion 130b and the second stopping portion 140a stopping each other during the relative rotation process of the base 130 and the pivoting member 140 may also be prevented, thereby the base 130 and the pivoting member 140 have a larger range of relative rotation. However, the relative locations between the first stopping portions and the second stopping portions are not limited in the invention, examples are as follows.

Figure 9:
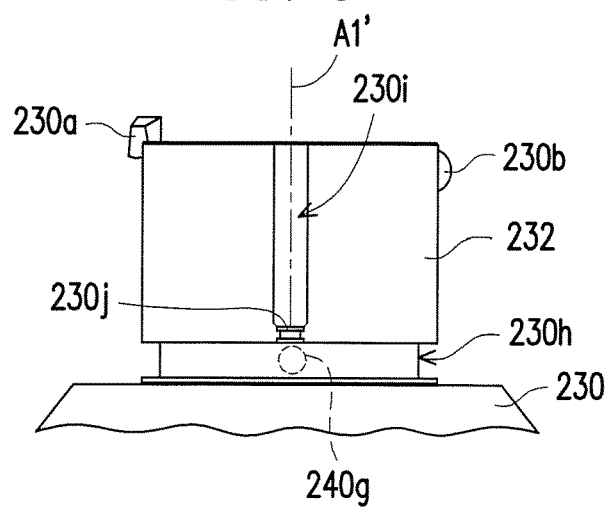
FIG. 9 is a side view of a base according to another embodiment of the invention.

FIG. 9 is a side view of a base according to another embodiment of the invention. In the embodiment shown in FIG. 9, the configuration and acting method of the base 230, the protrusion portion 232, the first stopping portion 230a, the first stopping portion 230b, the position limiting slot 230h, the recessed slot 230i, the stopping block 230j, the second stopping portion (not shown in the drawing), the protruding portion 240g and the rotation axis A1' are similar to the configuration and acting method of the base 130, the protrusion portion 132, the first stopping portion 130a, the first stopping portion 130b, the position limiting slot 130h, the recessed slot 130i, the stopping block 130j, the second stopping portion 140a (shown in FIG. 6), the protruding portion 140g and the rotation axis A1 of FIG. 8, and it is not repeated herein. The difference between the embodiment shown in FIG. 9 and the embodiment shown in FIG. 8 is that, the projections projected onto the rotation axis A1' of the first stopping portion 230a and the first stopping portion 230b are overlapped, thereby the projections projected onto the rotation axis A1' of the second stopping portion and the second stopping portion, respectively corresponding to the first stopping portion 230a and the first stopping portion 230b, are also overlapped.

Figure 10:
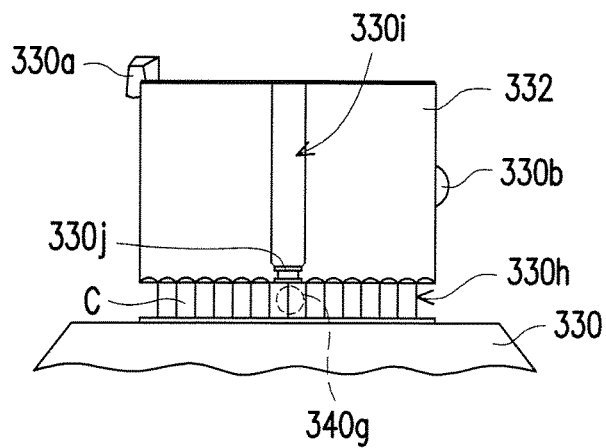
FIG. 10 is a side view of a base according to another embodiment of the invention.

FIG. 10 is a side view of a base according to another embodiment of the invention. In the embodiment shown in FIG. 10, the configuration and acting method of the base 330, the protrusion portion 332, the first stopping portion 330a, the first stopping portion 330b, the position limiting slot 330h, the recessed slot 330i, the stopping block 330j, the pivoting member (not shown in the drawing) and the protruding portion 340g are similar to the configuration and acting method of the base 130, the protrusion portion 132, the first stopping portion 130a, the first stopping portion 130b. the position limiting slot 130h, the recessed slot 130i, the stopping block 130j, the pivoting member 140 (shown in FIG. 2) and the protruding portion 140g of FIG. 8, and it is not repeated herein.

The difference between the embodiment shown in FIG. 10 and the embodiment shown in FIG. 8 is that, the position limiting slot 330h has a plurality of recess portions C sequentially connected therein and in annular tooth structure, the protruding portion 340g is interfered in one of the plurality of recess portions C so as to position the base 330 at the pivoting member, and the protruding portion 340g is adapted to move to another one of the plurality recess portions C along with the relative rotation of the base 330 and the pivoting member. As such, regardless of the amount of the rotation angle of the base 330 relative to the pivoting member, the base 330 may be positioned through the collocation of the protruding portion 340g and the recess portions C.

Figure 11:
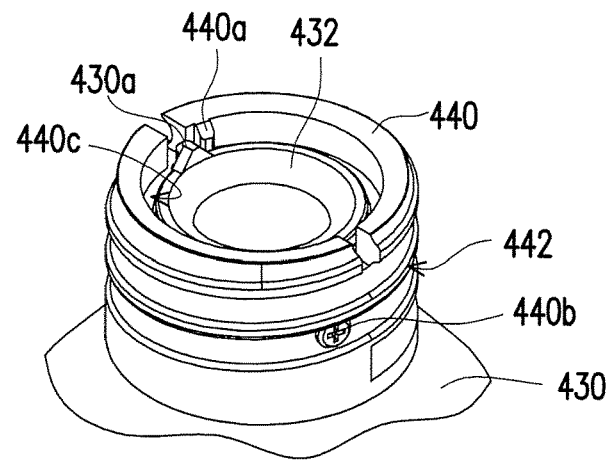
FIG. 11 is a partial structure exploded view of a projection apparatus according to another embodiment of the invention.
Figure 12:
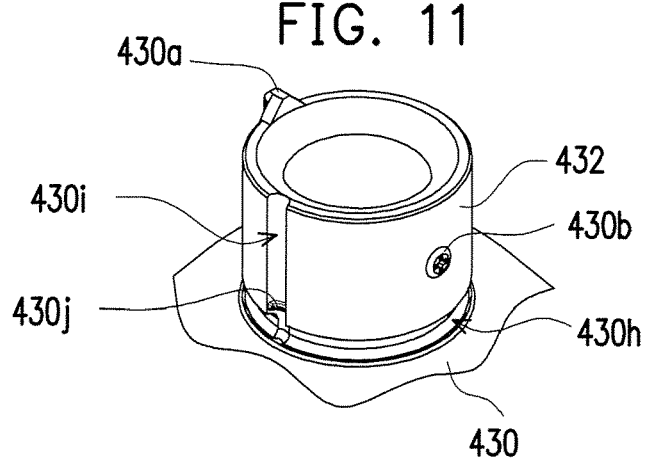
FIG. 12 is a perspective view showing the base in FIG. 11.
Figure 13:
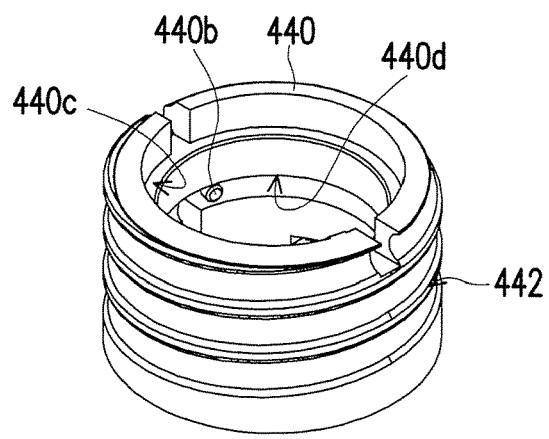
FIG. 13 is a perspective view illustrating the pivoting member depicted in FIG. 11 from another view angle.

In the abovementioned embodiment, the base, the pivoting member, the first stopping portions and the second stopping portions are made of plastic, for example, but the invention is not limited thereto, and examples are as follows. FIG. 11 is a partial structure exploded view of a projection apparatus according to another embodiment of the invention. FIG. 12 is a perspective view showing the base in FIG. 11. FIG. 13 is a perspective view illustrating the pivoting member depicted in FIG. 11 from another view angle. In the embodiments shown in FIG. 11, FIG. 12 and FIG. 13, the configuration and acting method of the base 430, the protrusion portion 432, the first stopping portion 430a, the first stopping portion 430b, the position limiting slot 430h, the recessed slot 430i, the stopping block 430j, the pivoting member 440, the first outer thread 442, the second stopping portion 440a, the second stopping portion 440b, the guiding slot 440c and the guiding slot 440d are similar to the configuration and acting method of the base 130, the protrusion portion 132, the first stopping portion 130a, the first stopping portion 130b, the position limiting slot 130h, the recessed slot 130i, the stopping block 130j, the pivoting member 140, the first outer thread 142, the second stopping portion 140a, the second stopping portion 140b, the guiding slot 140c and the guiding slot 140d shown in FIG. 1 through FIG. 8, and it is not repeated herein.

The difference between the embodiments shown in FIG. 11, FIG. 12 and FIG. 13 and the embodiments shown in FIG. 1 through FIG. 8 is that, the first stopping portion 430b and the second stopping portion 440b are made of metal, which is different from that the base 430 and the pivoting member 440 are made of metal. Specifically, the first stopping portion 430b and the second stopping portion 440b are, for example, screws which are made of metal, and are respectively fixed onto the base 430 and the pivoting member 440 by screw lock method. Because the first stopping portion 430b and the second stopping portion 440b are made of metal, the stopping effect being affected due to long time period of wear and deformation of the first stopping portion 430b and the second stopping portion 440b may be prevented. In other embodiments, the base, the pivoting member, the first stopping portion and the second stopping portion may be selected from other suitable materials according to design requirements, and the invention is not limited thereto.

Figure 14:
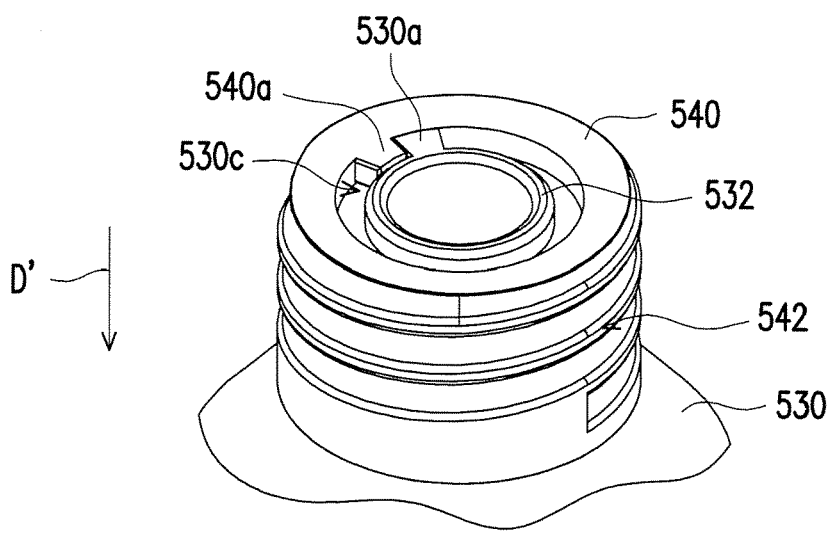
FIG. 14 is a partial structure exploded view of a projection apparatus according to another embodiment of the invention.
Figure 15:
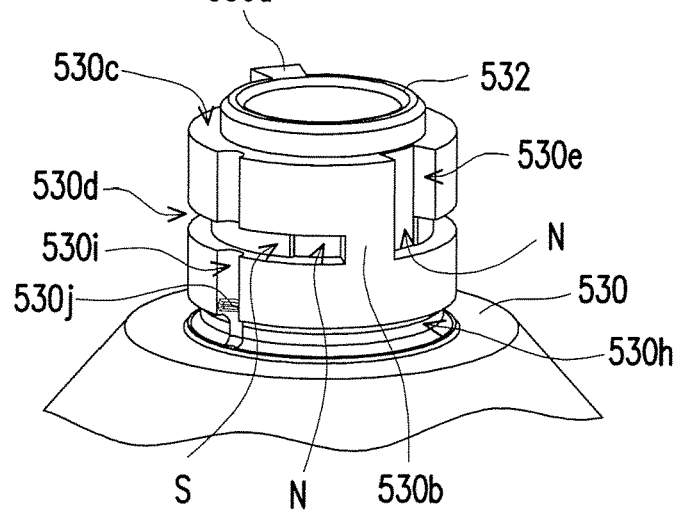
FIG. 15 is a perspective view showing the base in FIG. 14.
Figure 16:
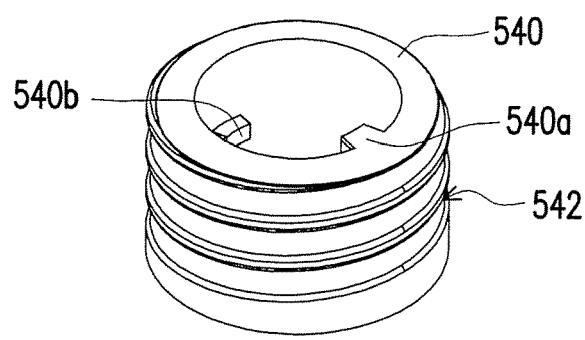
FIG. 16 is a perspective view illustrating the pivoting member depicted in FIG. 14 from another view angle.

FIG. 14 is a partial structure exploded view of a projection apparatus according to another embodiment of the invention. FIG. 15 is a perspective view showing the base in FIG. 14. FIG. 16 is a perspective view illustrating the pivoting member depicted in FIG. 14 from another view angle. In the embodiments shown in FIG. 14, FIG. 15 and FIG. 16, the configuration and acting method of the base 530, the protrusion portion 532, the first stopping portion 530a, the first stopping portion 530b, the position limiting slot 530h, the recessed slot 530i, the stopping block 530j, the pivoting member 540, the first outer thread 542, the second stopping portion 540a and the second stopping portion 540b are similar to the configuration and acting method of the base 130, the protrusion portion 132, the first stopping portion 130a, the first stopping portion 130b, the position limiting slot 130h, the recessed slot 130i, the stopping block 130j, the pivoting member 140, the first outer thread 142, the second stopping portion 140a and the second stopping portion 140b shown in FIG. 1 through FIG. 8, and it is not repeated herein.

The difference between the embodiments shown in FIG. 14, FIG. 15 and FIG. 16 and the embodiments shown in FIG. 1 through FIG. 8 is that, the pivoting member 540 does not have the guiding slots 140c, 140d of the pivoting member 140 shown in FIG. 5 and FIG. 6, and the protrusion portion 532 of the base 530 has the guiding slots 530c, 530d, namely, the guiding slots 530c, 530d are formed on the base 530, instead formed on the pivoting member 540. The first stopping portions 530a, 530b are formed in the guiding slots 530c, 530d respectively, the second stopping portions 540a, 540b are adapted to move along the guiding slots 530c, 530d along with the relative rotation of the base 530 and the pivoting member 540. In addition, the protrusion portion 532 of the base 530 has a recessed slot 530e, the extending direction of the recessed slot 530e is parallel to the assembling direction D' shown in FIG. 14, when the base 530 and the pivoting member 540 are combined together in the assembling direction D', the second stopping portion 540b moves along the recessed slot 530e and enters the guiding slot 530d. As such, the combination of the base 530 and the pivoting member 540 might not be hampered by the existing of the second stopping portion 540b.

In the embodiment, the second stopping portion 540b is adapted to move along the surface S within the guiding slot 530d of the base 530 and reach the first stopping portion 530b. The base 530 has at least one recess (shown two recesses N) in the guiding slot 530d, each of the recesses N is connected between the surface S and the first stopping portion 530b, and each of the recesses N and the surface S constitute discontinuous surfaces. As such, when the user rotates the base 530 to make the second stopping portion 540b prop against the first stopping portion 530b, the second stopping portion 540b may move to the recess N from the surface S, and instantly the operating feel of the user is changed. Through the change of the operating feel, the user may accordingly know that the second stopping portion 540b has reached the end of the guiding slot 530d and propped against the first stopping portion 530b, in order that the user continues to rotate the base 530 in the situation that the second stopping portion 540b has already been propped against the first stopping portion 530b to cause the damage of the base 530 or the pivoting member.

In light of the foregoing, according to the embodiments the invention, at least one of the following advantages or effects is achieved. The projection apparatus provided in the invention may be connected to an external power supply device through the pivoting member, so as to obtain a required electric power from the external power supply device. The so-called external power supply power device is, for example, a lamp holder existing in a general indoor environment, the projection apparatus can be installed to the lamp holder without using a power cord, as installing a lamp, thus the installation is simple. Moreover, the base of the projection apparatus may be rotated relative to the pivoting member merely by applied force of the user in order to change the angle of the base and the projection unit disposed thereon, thus the user is able to conveniently perform the angle adjustment of the projection images. In addition, the user may rotate the base to change the location and direction of the heat dissipating hole of the base, so that a good heat dissipation efficiency is achieved via the heat dissipating hole. Additionally, through the first stopping portion of the base and the second stopping portion of the pivoting member stopping each other, the rotation range of the base rotated by the user may be restricted, such that the user may perform the angle adjustment of the projection images in a predetermined angle range.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
a projection unit, comprising a light source, a light valve and a lens, wherein the light source is adapted to provide an illumination beam, the light valve is adapted to convert the illumination beam into an image beam, the lens is adapted to project the image beam so as to form a projection image;
a base, connected to the projection unit and comprising at least one first stopping portion; and
a pivoting member, pivoted to the base and comprising at least one second stopping portion, wherein the pivoting member is adapted to electrically connect to an external power supply device,
the base and the pivoting member are configured to adjust a projection angle of the projection image by relatively rotating the base and the pivoting member between a first stopping position and a second stopping position, wherein the first stopping position is 0 degree and the second stopping position is 350 degrees, and the at least one first stopping portion and the at least one second stopping portion are adapted to prop against each other as the base and the pivoting member relatively rotate with each other to the second stopping position, so as to stop the base and the pivoting member from relative rotation, wherein the pivoting member is able to remain electrically connected to the external power supply device as the base and the pivoting member relatively rotate with each other between the first stopping position and the second stopping position.

2. The projection apparatus as claimed in claim 1, wherein the base and the pivoting member are adapted to relatively rotate along a rotation axis, and the rotation axis is parallel to an optical axis of the lens.

3. The projection apparatus as claimed in claim 1, wherein the pivoting member has an outer thread and is adapted to screw to the external power supply device through the outer thread.

4. The projection apparatus as claimed in claim 1, further comprising an electrical connecting member, wherein the pivoting member has a first outer thread, the electrical connecting member has a second outer thread and an inner thread, the pivoting member and the electrical connecting member are adapted to be screwed to each other through the first outer thread and the inner thread, and the electrical connecting member is adapted to screw to the external power supply device through the second outer thread.

5. The projection apparatus as claimed in claim 1, wherein the external power supply device is a lamp holder.

6. The projection apparatus as claimed in claim 1, wherein the pivoting member is annular and disposed around the base, the at least one first stopping portion is formed at an outer wall of the base, and the at least one second stopping portion is formed at an inner wall of the pivoting member.

7. The projection apparatus as claimed in claim 1, wherein the base or the pivoting member has at least one guiding slot, one of the at least one first stopping portion and the at least one second stopping portion is formed in the at least one guiding slot, another one of the at least one first stopping portion and the at least one second stopping portion is adapted to move along the at least one guiding slot along with the relative rotation of the base and the pivoting member.

8. The projection apparatus as claimed in claim 7, wherein the base or the pivoting member has at least one recessed slot, an extending direction of the at least one recessed slot is parallel to an assembling direction, when the base and the pivoting member are combined together in the assembling direction, the at least one first stopping portion or the at least one second stopping portion moves along the at least one recessed slot and enters the at least one guiding slot.

9. The projection apparatus as claimed in claim 1, wherein a number of the at least one first stopping portion is a plurality, a number of the at least one second stopping portion is a plurality, the base and the pivoting member are adapted to relatively rotate along a rotation axis, projections projected on the rotation axis of the first stopping portions are not overlapped, and the projections projected on the rotation axis of the second stopping portions are not overlapped.

10. The projection apparatus as claimed in claim 1, wherein a number of the at least one first stopping portion is a plurality, a number of the at least one second stopping portion is a plurality, the base and the pivoting member are adapted to relatively rotate along a rotation axis, projections projected on the rotation axis of the first stopping portions are overlapped, and the projections projected on the rotation axis of the second stopping portions are overlapped.

11. The projection apparatus as claimed in claim 1, wherein the pivoting member has a protruding portion, the base has a position limiting slot, and the protruding portion is restricted in the position limiting slot so as to stop the base from separating from the pivoting member.

12. The projection apparatus as claimed in claim 11, wherein the position limiting slot has a plurality of recess portions sequentially connected therein, the protruding portion is interfered in one of the plurality of recess portions so as to position the base at the pivoting member, and the protruding portion is adapted to move to another one of the plurality of recess portions along with the relative rotation of the base and the pivoting member.

13. The projection apparatus as claimed in claim 11, wherein the base has a recessed slot, an extending direction of the recessed slot is parallel to an assembling direction, when the base and the pivoting member are combined together in the assembling direction, the protruding portion moves along the recessed slot and enters the position limiting slot.

14. The projection apparatus as claimed in claim 13, wherein the base has a stopping block at a common boundary between the recessed slot and the position limiting slot, and the stopping block stops the protruding portion located in the position limiting slot from moving into the recessed slot.

15. The projection apparatus as claimed in claim 11, wherein the pivoting member has an elastic arm, and the protruding portion is formed on the elastic arm.

16. The projection apparatus as claimed in claim 1, wherein a material of the base and the pivoting member is plastic, and a material of the at least one first stopping portion is metal and a material of the at least one second stopping portion is metal.

17. The projection apparatus as claimed in claim 1, wherein the at least one second stopping portion is adapted to move along a surface of the base and reach the at least one first stopping portion, the base has at least one recess, the at least one recess is connected between the surface and the at least one first stopping portion, and the at least one recess and the surface constitute discontinuous surfaces.

* * * * *